(12) United States Patent
Cohen et al.

(10) Patent No.: US 9,189,339 B1
(45) Date of Patent: Nov. 17, 2015

(54) REPLICATION OF A VIRTUAL DISTRIBUTED VOLUME WITH VIRTUAL MACHINE GRANUALARITY

(71) Applicant: EMC Corporation, Hopkinton, MA (US)

(72) Inventors: Saar Cohen, Moshav Mishmeret (IL); Assaf Natanzon, Tel Aviv (IL); Bradford B. Glade, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 132 days.

(21) Appl. No.: 14/229,467

(22) Filed: Mar. 28, 2014

(51) Int. Cl.
*G06F 11/00* (2006.01)
*G06F 11/14* (2006.01)

(52) U.S. Cl.
CPC .................................. *G06F 11/1412* (2013.01)

(58) Field of Classification Search
USPC .................................................. 714/4.11, 4.1
See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Pan Lies at the Heart of Compression Technology;" Apr. 29, 1991; p. 1.

(Continued)

*Primary Examiner* — Sarai Butler
(74) *Attorney, Agent, or Firm* — Daly, Crowley, Mofford & Durkee, LLP (57) ABSTRACT

In one aspect, a method includes intercepting an I/O sent by a virtual machine at a first site, sending the I/O to a first data protection appliance (DPA) at the first site, sending I/O metadata to a first service layer at the first site, sending I/O data down the I/O stack after receiving acknowledgement that the I/O metadata arrived at the first service layer, intercepting the I/O at the first service layer, sending the I/O metadata from the first service layer to a second service layer at a second site and sending I/O data to the second service layer at the second site by ensuring that I/O metadata mirroring between the first site and the second site is completed before I/O data mirroring occurs between the first site and the second site.

19 Claims, 8 Drawing Sheets

(56) References Cited

U.S. PATENT DOCUMENTS

| | | |
|---|---|---|
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,281,071 B1 * | 10/2012 | Vohra ............... H04L 67/1097 711/114 |
| 8,332,687 B1 | 12/2012 | Natanzon et al. |
| 8,335,761 B1 | 12/2012 | Natanzon |
| 8,335,771 B1 * | 12/2012 | Natanzon ......... G06F 17/30008 707/684 |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |

(56) References Cited

U.S. PATENT DOCUMENTS

| | | | |
|---|---|---|---|
| 2006/0149793 A1* | 7/2006 | Kushwah | G06F 11/1471 |
| 2006/0161810 A1 | 7/2006 | Bao | |
| 2006/0179343 A1 | 8/2006 | Kitamura | |
| 2006/0195670 A1 | 8/2006 | Iwamura et al. | |
| 2006/0212462 A1 | 9/2006 | Hellen et al. | |
| 2007/0055833 A1 | 3/2007 | Vu et al. | |
| 2007/0162513 A1 | 7/2007 | Lewin et al. | |
| 2007/0180304 A1 | 8/2007 | Kano | |
| 2007/0198602 A1 | 8/2007 | Ngo et al. | |
| 2007/0198791 A1 | 8/2007 | Iwamura et al. | |
| 2007/0220311 A1* | 9/2007 | Lewin | G06F 11/1471 |
| | | | 714/6.32 |
| 2007/0266053 A1 | 11/2007 | Ahal et al. | |
| 2008/0082591 A1 | 4/2008 | Ahal et al. | |
| 2008/0082592 A1 | 4/2008 | Ahal et al. | |
| 2008/0082770 A1 | 4/2008 | Ahal et al. | |

OTHER PUBLICATIONS

Soules, "Metadata Efficiency in Versioning File Systems;" 2003; pp. 1-16.
AIX System Management Concepts: Operating Systems and Devices; May 2000; pp. 1-280.
Souies et al.; "Metadata Efficiency in a Comprehensive Versioning File System;" May 2002; CMU-CS-02-145; School of Computer Science, Carnegie Mellon University, Pittsburgh, PA 15213; 33 pages.
Linux Fiiesystems; Sams Publishing; 2002; pp. 17-22 and 67-71.
Bunyan, "Multiplexing in a BrightStor® ARCserve® Backup Release 11;" Mar. 2004; pp. 1-4.
Marks, "Network Computing;" Feb. 2, 2006; pp. 1-8.
Hill, "Network Computing;" Jun. 8, 2006; pp. 1-9.
Microsoft Computer Dictionary; 2002; Press Fifth Edition; 2 pages.
Retrieved from http://en.wikipedia.org/wiki/DEFLATE; DEFLATE; Jun. 19, 2008; pp. 1-6.
Retrieved from http://en.wikipedia.org/wiki/Huffman_coding; Huffman Coding; Jun. 8, 2008; pp. 1-11.
Retrieved from http:///en.wikipedia.org/wiki/LZ77; LZ77 and LZ78; Jun. 17, 2008; pp. 1-2.
U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

REPLICATION OF A VIRTUAL DISTRIBUTED VOLUME WITH VIRTUAL MACHINE GRANUALARITY

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes intercepting an I/O sent by a virtual machine at a first site, sending the I/O to a first data protection appliance (DPA) at the first site, sending I/O metadata to a first service layer at the first site, sending I/O data down the I/O stack after receiving acknowledgement that the I/O metadata arrived at the first service layer, intercepting the I/O at the first service layer, sending the I/O metadata from the first service layer to a second service layer at a second site and sending I/O data to the second service layer at the second site by ensuring that I/O metadata mirroring between the first site and the second site is completed before I/O data mirroring occurs between the first site and the second site.

In another aspect, an apparatus includes electronic hardware circuitry configured to intercept an I/O sent by a virtual machine at a first site, send the I/O to a first data protection appliance (DPA) at the first site, send I/O metadata to a first service layer at the first site, send I/O data down the I/O stack after receiving acknowledgement that the I/O metadata arrived at the first service layer, intercept the I/O at the first service layer, send the I/O metadata from the first service layer to a second service layer at a second site and send I/O data to the second service layer at the second site by ensuring that I/O metadata mirroring between the first site and the second site is completed before I/O data mirroring occurs between the first site and the second site.

In a further aspect, an article includes a non-transitory computer-readable medium that stores computer-executable instructions. The instructions cause a machine to intercept an I/O sent by a virtual machine at a first site, send the I/O to a first data protection appliance (DPA) at the first site, send I/O metadata to a first service layer at the first site, send I/O data down the I/O stack after receiving acknowledgement that the I/O metadata arrived at the first service layer, intercept the I/O at the first service layer, send the I/O metadata from the first service layer to a second service layer at a second site and send I/O data to the second service layer at the second site by ensuring that I/O metadata mirroring between the first site and the second site is completed before I/O data mirroring occurs between the first site and the second site.

DETAILED DESCRIPTION

Described herein are techniques to have a splitter in a hypervisor perform replication and send I/Os to the DPAs in their "VMDK form." The splitter signals to the underlying service layer (virtual or physical) about the I/O metadata of these I/Os through a special command, but not sending the actual data. Other techniques describe using the service layer as a tracker to track I/O metadata in a backlog. By utilizing the techniques, replication is done in a per-VMDK granularity, since the DPA gets I/Os from a splitter in a hypervisor. Services layers with backlogs on both sites keep the same backlog of the changes that were applied, thus allowing for failovers from one site to the other, while using this backlog to perform re-synchronization.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 1:
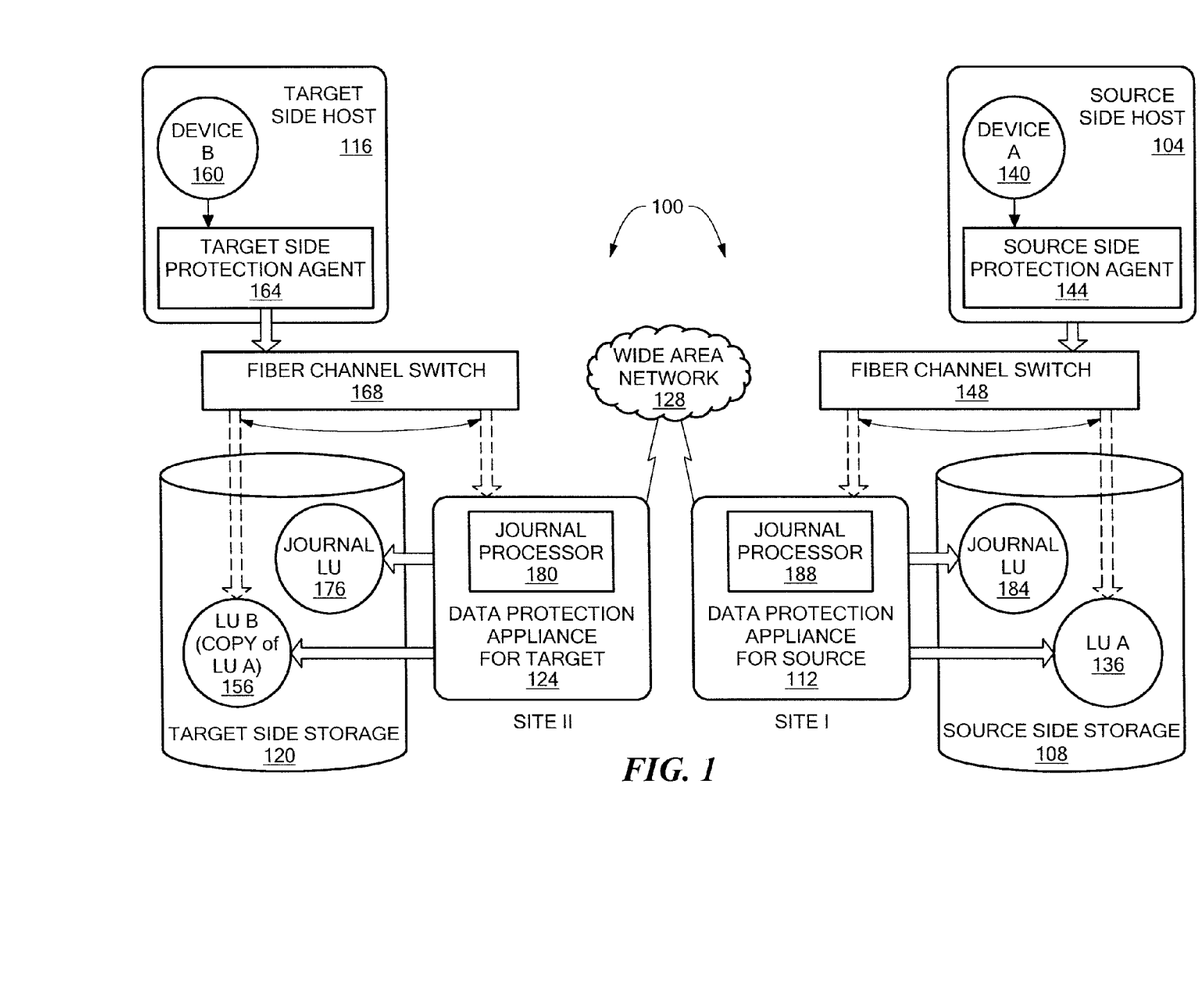
FIG. 1 is a block diagram of an example of a data protection system.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
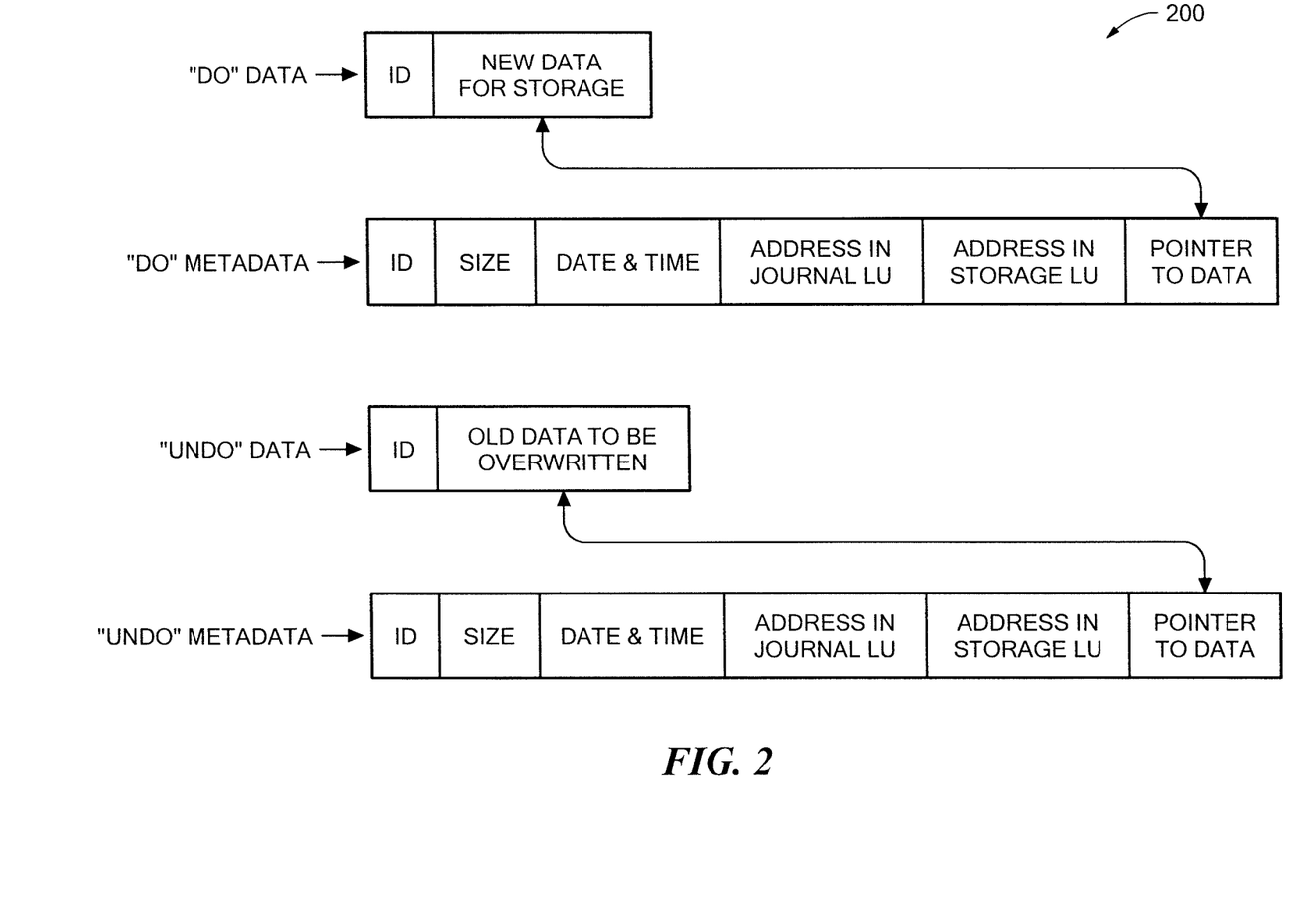
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
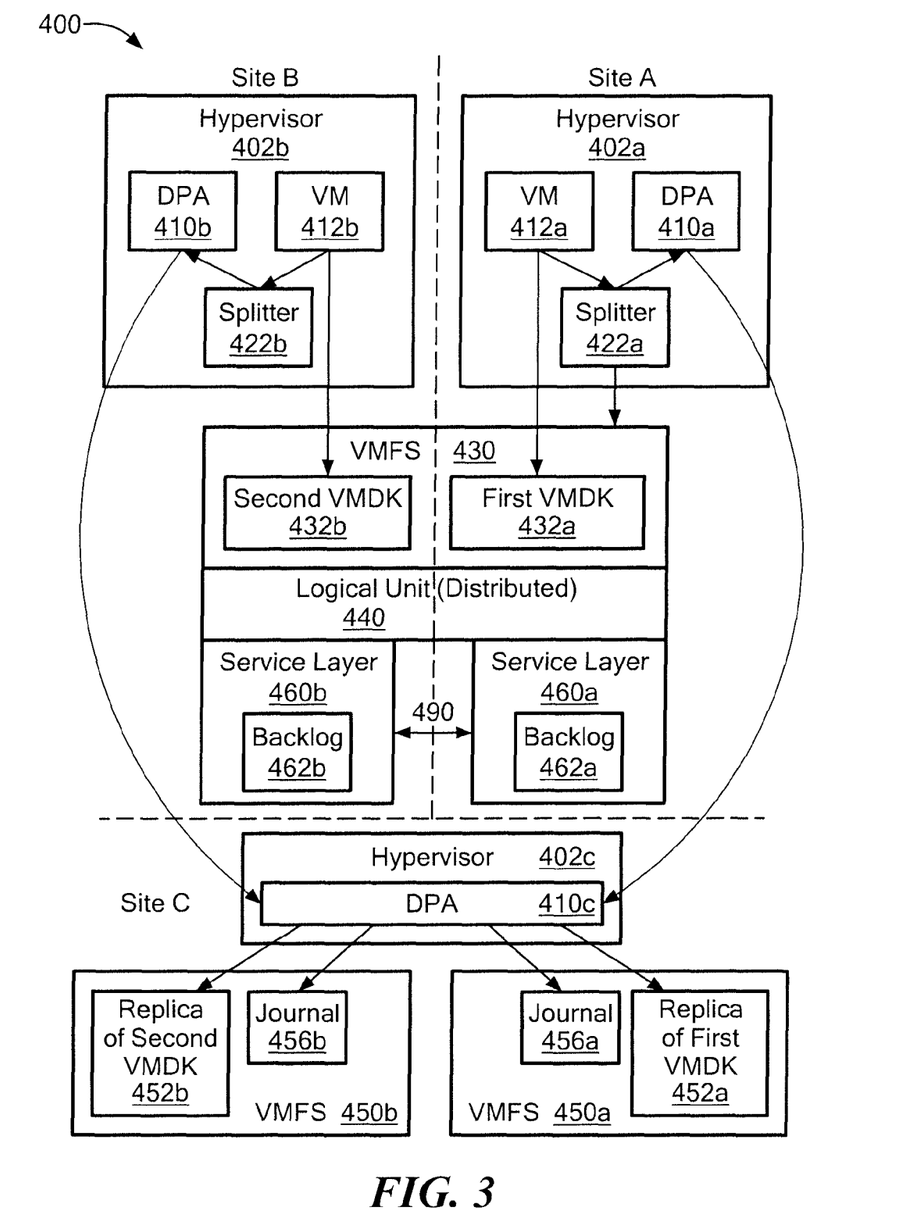
FIG. 3 is a block diagram of another example of the data protection system in a virtual environment.

Referring to FIG. 3, an example of the data protection system used in a virtual environment is a data protection system 300. The system 300 is spread over three sites: site A, site B and site C.

Site A includes a hypervisor 402*a*, a virtual file management system (VFMS) 430, a logical unit (LU) 440 and a service layer 460*a*. The hypervisor 402*a* includes a data protection appliance 410*a*, a virtual machine (VM) 412*a* and a splitter 422*a*. The VMFS 430 includes a first virtual machine disk 432*a* which is accessed by the VM 112*a*. The service layer includes a backlog 462*a*.

Site B includes a hypervisor 402*b*, the VFMS 430, the LU 440 and a service layer 460*b*. The hypervisor 402*b* includes a data protection appliance 410*b*, a VM 412*b* and a splitter 422*b*. The VMFS 430 includes a second virtual machine disk 432*b* which is accessed by the VM 112*b*. The service layer includes a backlog 462*b*.

Site C includes a hypervisor 402*c*, a VFMS 450*a* and a VMFS 450*b*. The VMFS 450*a* includes a replica 452*a* of the first virtual machine disk 432*a* and a journal 456*a* and the VMFS 450*b* includes a replica 452*b* of the second virtual machine disk 432*b* and a journal 456*b*.

In the system 300, the service layers 460*a*, 460*b* are depicted as physical devices. One of ordinary skill in the art would recognize that the service layers 460a, 460b may be virtual service layers, for example, within hypervisors 402a, 402b respectively. In one example, the service layers are an EMC® VPLEX®.

The service layers 460a, 460b mirror the data between site A and site B and allow the VMFS 430 to spread across the two sites. At the replica site each VM may be replicated to a separate VMFS (e.g., VMFS 450a and VMFS 450b), but they may also be replicated to the same VMFS (e.g., VMFS) 450a.

A link 490 between the service layers 460a, 460b, ensures that the backlog 462b and the backlog 462b are synchronized. As will be described further herein, this is important during a site failure.

Figure 4:
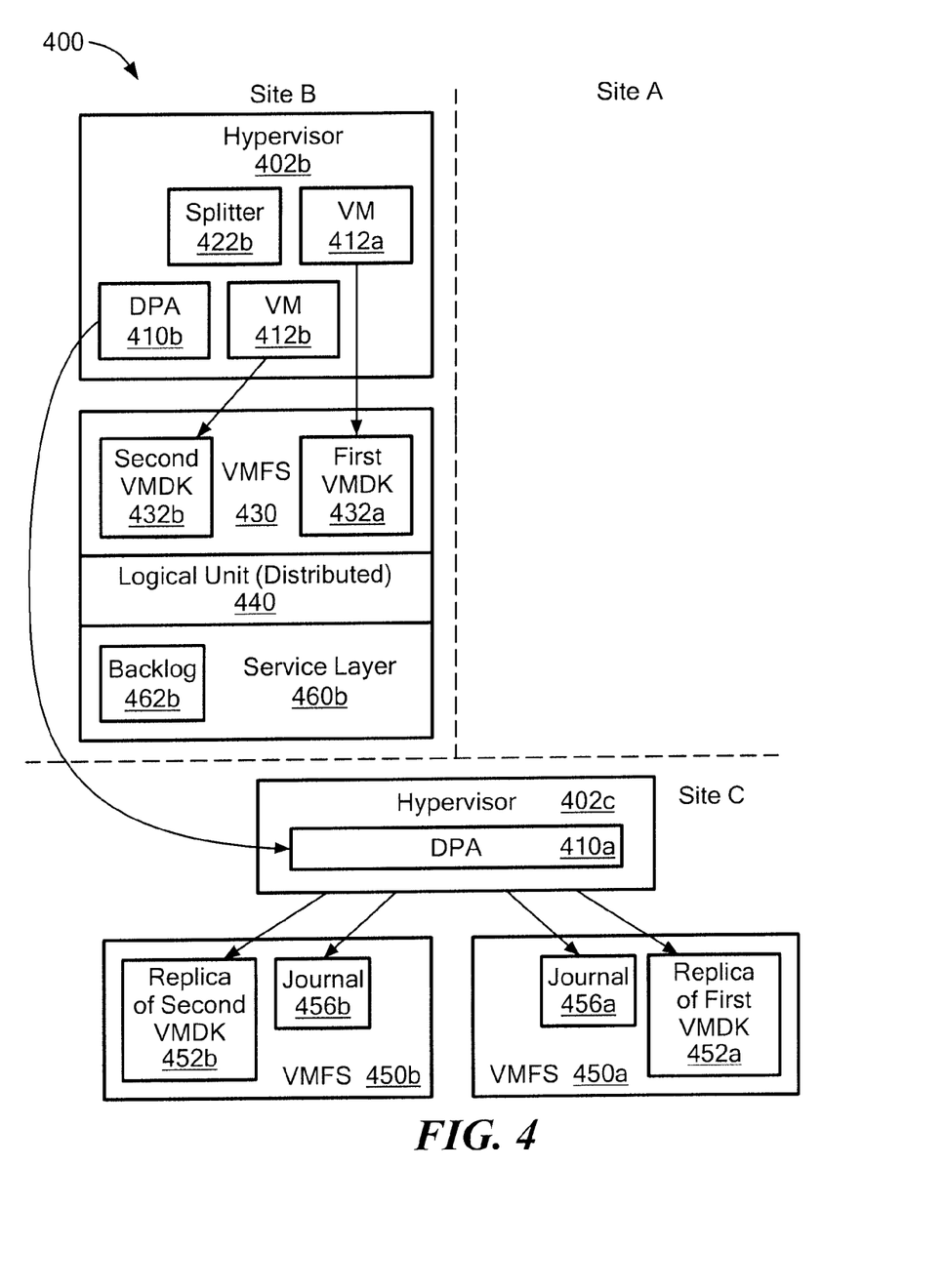
FIG. 4 is a block diagram of the data protection system in FIG. 3 after failure at a site.

Referring to FIG. 4, the system 400 is depicted after site A fails. The VM 412a is transferred over to the hypervisor 402b at site B. Since the VMFS 430 is mirrored data of VMDK 432a is accessible at site B. The system 400 then resumes replication from VM 412b at site B to replica VMFS 450a at site C.

Figure 5:
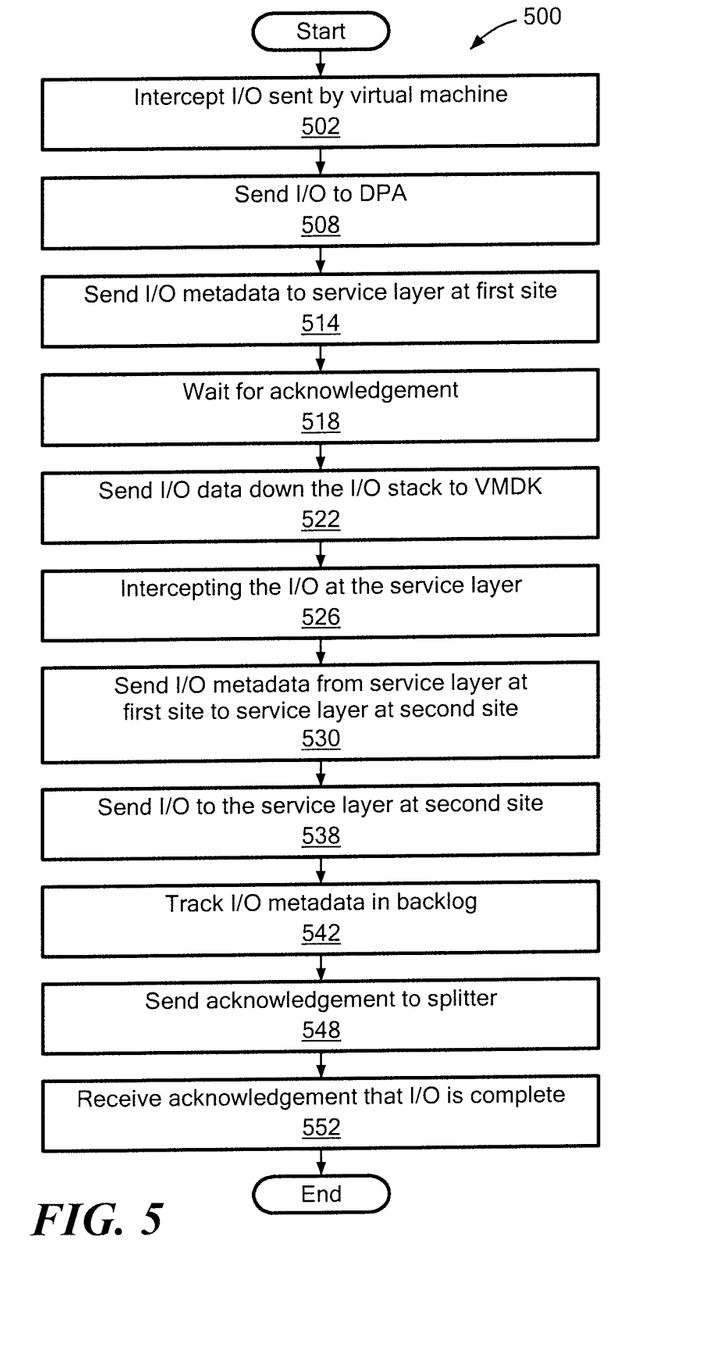
FIG. 5 is a flowchart of an example of a process to replicate data in a virtual environment.

Referring to FIG. 5, an example of a process to replicate data in system 400 is a process 500. Process 500 intercepts an I/O (502) and sends it to the DPA (508). For example, the splitter 422a intercepts (splits) an I/O sent by the virtual machine 412a and sends the I/O to the DPA 410a.

Process 500 sends I/O metadata to a service layer (514) and waits for acknowledgment (518). For example the splitter 422a sends I/O metadata to the service layer 460a and waits for acknowledgment from the service layer 460a that the I/O metadata arrived and waits for acknowledgement from the DPA 410a that the I/O arrived. In one example, the I/O metadata includes the ID of the virtual machine and the offset (address) where data in the I/O is going.

Process 500 sends I/O data down the I/O stack to the VMDK (522). For example, the splitter 422a sends the I/O to VMDK 432a. Process 500 intercepts the I/O at the service layer (526). For example, the I/O to VMDK 432a is split by the hypervisor 402a and sent to the VMFS 430, which resides on the distributed logical unit 440.

Process 500 sends the I/O metadata to the service layer at the second site (530) and sends I/O data to the service layer at the second site (538). For example, the I/O metadata and the I/O data are sent to service layer 460b at site B by the service layer 460a, which is exposed by the logical unit 440. In particular, the I/O metadata is sent to the backlog 462b through mirroring of the backlog 462a and the I/O data is mirrored to second layer 460b through the logical unit 440.

Process 500 ensures that processing block 530 is performed first before processing block 538 is completed (i.e., the I/O metadata mirroring is completed before I/O data mirroring occurs between site A and site B).

Process 500 tracks I/O metadata in the backlog (542). For example, the service layers 460a, 460b track the I/O metadata using the backlog 462a, 464b, respectively. Process 500 sends acknowledgment to the splitter (548), for example, returns an SCSI acknowledgement to the splitter 422a (e.g., the acknowledgement is received from the I/O stack which receives the acknowledgement from the service layer). Process 500 sends acknowledgement to the virtual machine that the I/O is complete (552). For example, the splitter 422a once it receives the acknowledgement returns the acknowledgement up the I/O stack to the VM 412a.

Figure 6:
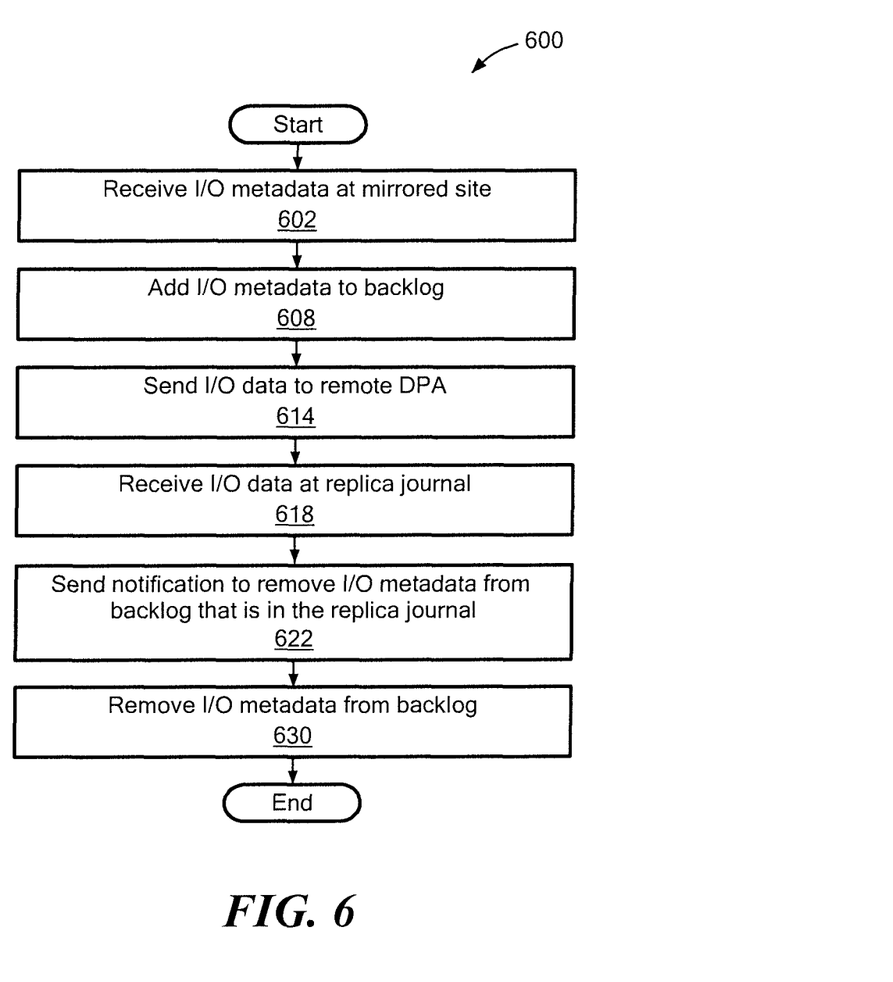
FIG. 6 is a flowchart of an example of a process to manage a backlog.

Referring to FIG. 6, an example of a process to manage a backlog is a process 600. Process 600 receives I/O metadata at a mirrored site (e.g., the metadata handling is between site A and site B) (602) and adds the I/O metadata to backlog (608). For example, the I/O metadata for the first VM 432a is received at the service layer 460a, which is mirrored to the service layer 460b, so that the I/O metadata is added to backlog 462b as well as backlog 462a.

Process 600 sends I/O data to remote DPA (614). For example, the DPA 410a sends the I/O data to the DPA 410c.

Process 600 receives I/O data at the replica journal (618). For example, the journal 456a receives the I/O data.

Process 600 sends a notification to remove I/O metadata received by the journal from backlog (622) and the I/O metadata received by the journal is removed from the backlog (630). For example, the DPA 410c notifies DPA 410a which notifies the service layer 460a (which notifies the service layer 460b) to remove the I/O metadata received by the journal from the backlog 462a, 462b and the I/O metadata received by the journal is removed from the backlog 462a, 462b.

Figure 7:
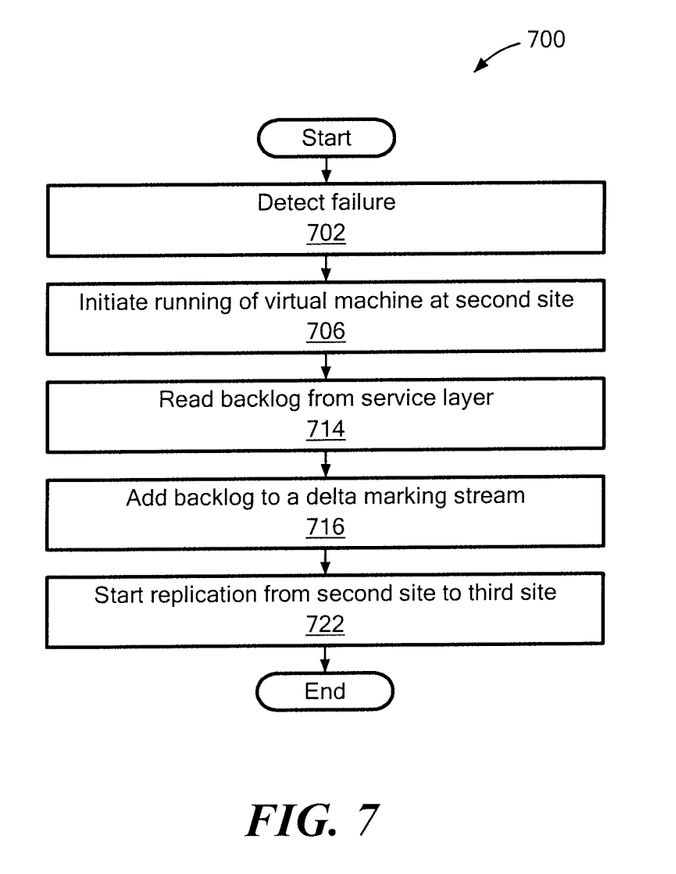
FIG. 7 is a flowchart of an example of a process to recover from a failure of a site.

Referring to FIG. 7, an example of a process to recover from a failure of a site is a process 600. For example, a first site (site A) has failed and a second site (site B) takes over. Process 700 detects failure (702) and initiates running of the virtual machine previously running at the first site, at the second site. For example, the VM 412a is now running at site B. In some examples, the detection may be done by a witness machine running at a third site. In other examples the failure may be detected by a hypervisor or a service layer.

Process 700 reads backlog from the service layer (714) and adds backlog to delta marking stream (716). For example, the backlog 462b is read by the service layer 460b and added to the delta marking stream in the journal 456a. A delta marking stream (DMS) is a stream of differences between the replica volume (site C) and the production volume (original volume). In this case, the DMS is a stream of differences between VMDK 432a and the replica 452a.

Process 700 starts replication of virtual machine 412a from the second site to the third site (722). For example, replication is done from site B to site C.

Figure 8:
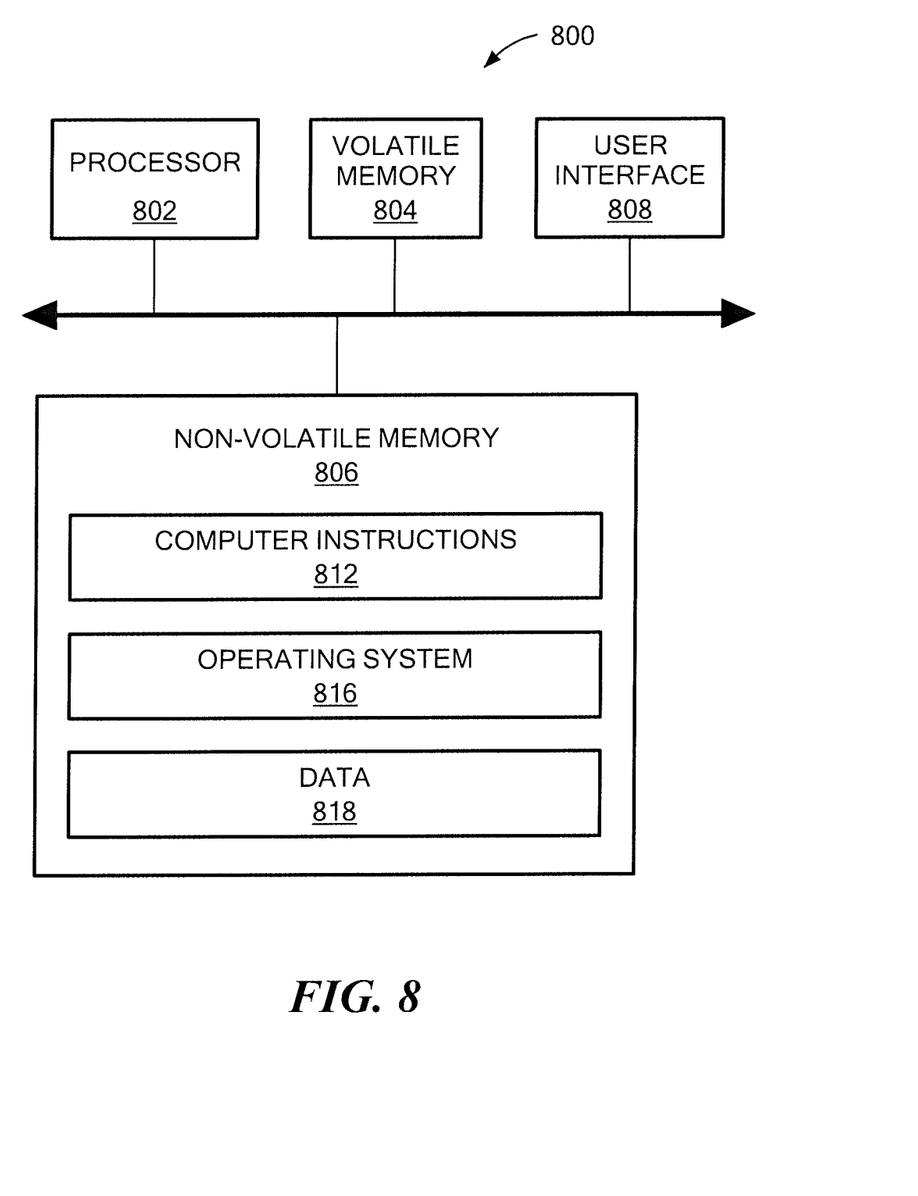
FIG. 8 is a computer on which any of the processes of FIGS. 5 to 7 may be implemented.

Referring to FIG. 8, in one example, a computer 800 includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes 500, 600 and 700).

The processes described herein (e.g., processes 500, 600 and 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500, 600 and 700 are not limited to the specific processing order of FIGS. 5 to 7, respectively. Rather, any of the processing blocks of FIGS. 5 to 7 may be re-ordered, combined or removed, performed in parallel or in serial, as necessary, to achieve the results set forth above.

The processing blocks (for example, in the processes 500, 600 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:
1. A method comprising:
intercepting an I/O sent by a virtual machine at a first site;
sending the I/O to a first data protection appliance (DPA) at the first site;
sending I/O metadata to a first service layer at the first site;
sending I/O data down the I/O stack after receiving acknowledgement that the I/O metadata arrived at the first service layer;
intercepting the I/O at the first service layer;
sending the I/O metadata from the first service layer to a second service layer at a second site; and
sending I/O data to the second service layer at the second site by ensuring that I/O metadata mirroring between the first site and the second site is completed before I/O data mirroring occurs between the first site and the second site.

2. The method of claim 1, further comprising replicating the I/O at a replica site.
3. The method of claim 1, further comprising tracking the I/O metadata in a first backlog at the first service layer.
4. The method of claim 3, further comprising:
receiving I/O data at the second service layer of the second site;
adding I/O metadata to a second backlog at the second service layer, the second backlog being a mirror of the first backlog;
sending I/O data to a second DPA at a replica site; and
receiving I/O data at a journal at the replica site.
5. The method of claim 4, further comprising:
sending a notification to remove the I/O metadata received by the journal from the first backlog; and
removing the I/O metadata received by the journal from the first backlog after receiving the notification.
6. The method of claim 4, further comprising:
detecting failure at the first site;
running the virtual machine at the second site;
reading the second backlog from the second service layer at the second site;
adding the second backlog to a delta marking stream at the journal; and
replicating the second site to the replica site.
7. An apparatus, comprising:
electronic hardware circuitry configured to:
intercept an I/O sent by a virtual machine at a first site;
send the I/O to a first data protection appliance (DPA) at the first site;
send I/O metadata to a first service layer at the first site;
send I/O data down the I/O stack after receiving acknowledgement that the I/O metadata arrived at the first service layer;
intercept the I/O at the first service layer;
send the I/O metadata from the first service layer to a second service layer at a second site; and
send I/O data to the second service layer at the second site by ensuring that I/O metadata mirroring between the first site and the second site is completed before I/O data mirroring occurs between the first site and the second site.
8. The apparatus of claim 7, wherein the circuitry comprises at least one of a processor, a memory, a programmable logic device or a logic gate.
9. The apparatus of claim 7, further comprising circuitry configured to replicate the I/O at a replica site.
10. The apparatus of claim 7, further comprising circuitry configured to track the I/O metadata in a first backlog at the first service layer.
11. The apparatus of claim 10, further comprising circuitry configured to:
receive I/O data at the second service layer of the second site;
add I/O metadata to a second backlog at the second service layer, the second backlog being a mirror of the first backlog;
send I/O data to a second DPA at a replica site; and
receive I/O data at a journal at the replica site.
12. The apparatus of claim 11, further comprising circuitry configured to:
send a notification to remove the I/O metadata received by the journal from the first backlog; and
remove the I/O metadata received by the journal from the first backlog after receiving the notification.
13. The apparatus of claim 11, further comprising circuitry configured to:

detect failure at the first site;
run the virtual machine at the second site;
read the second backlog from the second service layer at the second site;
add the second backlog to a delta marking stream at the journal; and
replicate the second site to the replica site.

14. An article comprising:
a non-transitory computer-readable medium that stores computer-executable instructions, the instructions causing a machine to:
intercept an I/O sent by a virtual machine at a first site;
send the I/O to a first data protection appliance (DPA) at the first site;
send I/O metadata to a first service layer at the first site;
send I/O data down the I/O stack after receiving acknowledgement that the I/O metadata arrived at the first service layer;
intercept the I/O at the first service layer;
send the I/O metadata from the first service layer to a second service layer at a second site; and
send I/O data to the second service layer at the second site by ensuring that I/O metadata mirroring between the first site and the second site is completed before I/O data mirroring occurs between the first site and the second site.

15. The article of claim 14, further comprising instructions causing the machine to replicate the I/O at a replica site.

16. The article of claim 14, further comprising instructions causing the machine to track the I/O metadata in a first backlog at the first service layer.

17. The article of claim 16, further comprising instructions causing the machine to:
receive I/O data at the second service layer of the second site;
add I/O metadata to a second backlog at the second service layer, the second backlog being a mirror of the first backlog;
send I/O data to a second DPA at a replica site; and
receive I/O data at a journal at the replica site.

18. The article of claim 17, further comprising instructions causing the machine to:
send a notification to remove the I/O metadata received by the journal from the first backlog; and
remove the I/O metadata received by the journal from the first backlog after receiving the notification.

19. The article of claim 17, further comprising instructions causing the machine to:
detect failure at the first site;
run the virtual machine at the second site;
read the second backlog from the second service layer at the second site;
add the second backlog to a delta marking stream at the journal; and
replicate the second site to the replica site.

* * * * *